J. WESTON.
STEEL SQUARE.
APPLICATION FILED MAY 21, 1910.

968,503.

Patented Aug. 23, 1910.

Witnesses:
L. H. Grote
W. E. Keir

Inventor
Jesse Weston
By his Attorneys
Howson and Howson

UNITED STATES PATENT OFFICE.

JESSE WESTON, OF PLAINFIELD, NEW JERSEY.

STEEL SQUARE.

968,503.  Specification of Letters Patent.  Patented Aug. 23, 1910.

Application filed May 21, 1910. Serial No. 562,566.

*To all whom it may concern:*

Be it known that I, JESSE WESTON, a citizen of the United States of America, and residing at Plainfield, in the county of Essex and State of New Jersey, have invented a certain new and useful Improvement in Steel Squares, of which the following is a specification.

My invention relates to steel squares and particularly to detachable squares, the object of my invention being to provide a simple joint by means of which the parts of the square may be readily assembled and disengaged.

Figure 1:
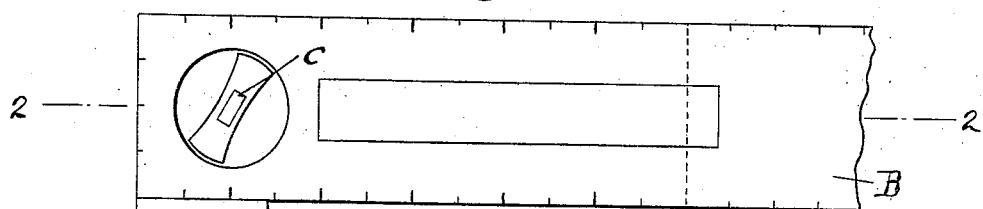
Figure 2:
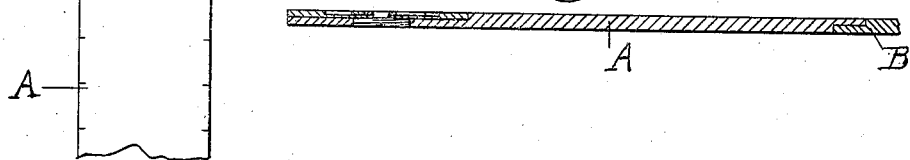
Figure 3:
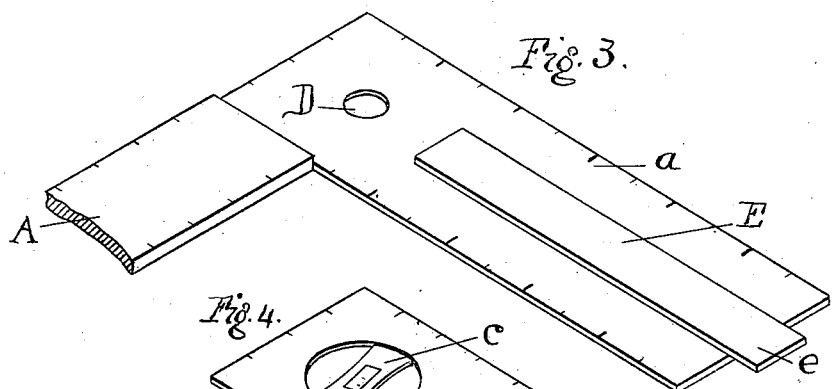
Figure 4:
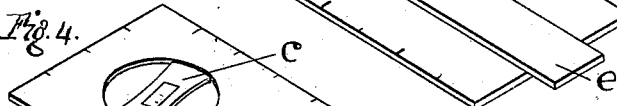

In the accompanying drawings, Figure 1 is a broken plan of a square showing my improved joint in one form; Fig. 2 is a section on the line 2—2, Fig. 1; Figs. 3 and 4 are perspective views of the two arms of the square detached; and Fig. 5 is a perspective showing my joint in modified form.

In the form shown in Figs. 1 to 4 inclusive, my improved square comprises two arms A and B, the arm A having at one end a six inch tongue $a$ at right angles thereto, preferably of the same width as the arm B and graduated so as to form in connection with the arm A the handy six inch square so constantly in use by a carpenter. In order to form a flush splice or lap joint with the arm B, the tongue $a$ is cut away half its thickness, and the end of the arm B is correspondingly recessed so that when the parts are assembled the square is of uniform thickness throughout. The arms are locked together at one end of the tongue $a$ by a thumb screw C carried by the arm B and having its head countersunk so as to lie flush with the upper face of arm B. The screw enters the threaded hole D in arm A. At the other end of the tongue the projecting end $e$ of the rib E enters the corresponding recess $e^1$ in the upper face of the arm B. It is obvious that upon tightening the screw C the parts are thus securely locked together, but in order that any injury due to torsional strains may be avoided, I form the long rib E upon the tongue $a$ and the corresponding slot F in the arm B which it enters when the parts are assembled thus adding greatly to the rigidity of the joint.

Figure 5:
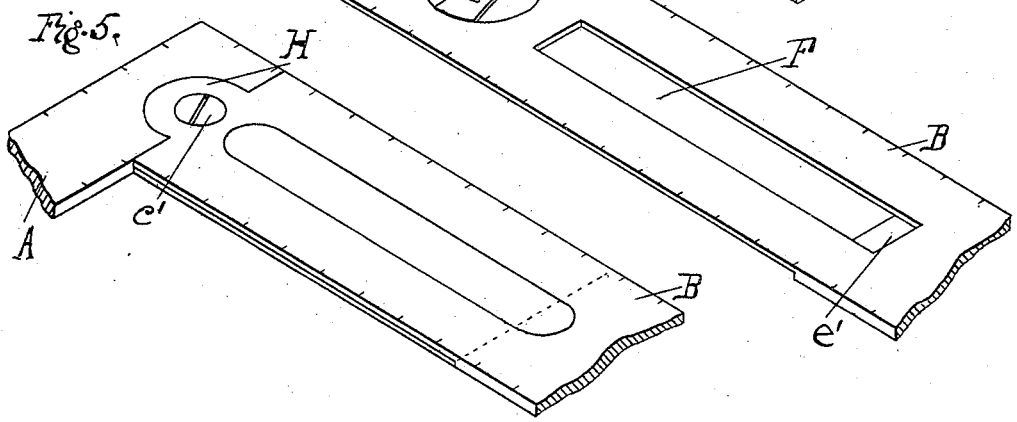

In the modified form of joint shown in Fig. 5, the splice with arm B is not carried all the way across the head of the arm A, but the arm B terminates in a rounded projection H carrying the screw $C^1$, here with slotted head for a screw driver, the projection entering a corresponding recess in the end of the arm A. In other respects the joint is similar to that just described.

Other variations in detail will readily suggest themselves and I do not limit my invention to the precise form shown.

I claim as my invention:

1. A square or the like, having separable arms reciprocally recessed to form a flush lap joint, one of said arms being perforated to receive a securing screw, and being provided with a longitudinal rib projecting in part beyond the end of said arm, the other arm carrying a countersunk securing screw to enter said perforation, said arm being longitudinally perforated to receive said rib and recessed to receive the extension of said rib, said recess forming a continuation of said longitudinal perforation, substantially as and for the purpose described.

2. A square or the like comprising separable arms reciprocally recessed to form a flush lap joint, one of said arms having a longitudinal rib projecting in part beyond the end thereof and the other arm being perforated to receive said rib and having a recess in extension of said perforation to receive the projecting end of said rib, together with a countersunk securing screw carried by one of said arms, the other arm being perforated by a threaded hole to receive said securing screw, substantially as described.

In testimony whereof I have signed my name to this specification, in the presence of two subscribing witnesses.

JESSE WESTON.

Witnesses:
GEORGE BRIDEGROOM,
JAMES MITCHELL.